United States Patent [19]
Haworth

[11] Patent Number: 4,581,770
[45] Date of Patent: Apr. 8, 1986

[54] FAIL SAFE REPEATER FOR FIBER OPTIC BUS DISTRIBUTION SYSTEM

[75] Inventor: Robert F. Haworth, Gloucester Township, Camden County, N.J.

[73] Assignee: RCA Corporation, Princeton, N.J.

[21] Appl. No.: 562,516

[22] Filed: Dec. 19, 1983

[51] Int. Cl.⁴ .............................. H04B 9/00
[52] U.S. Cl. ........................ 455/601; 455/607; 340/825.05; 370/1; 179/175.3 S
[58] Field of Search .......... 370/1, 16, 75, 97, 85; 340/825.05; 179/175.3 S, 175.31 R; 455/601, 606, 607, 612, 8, 613

[56] References Cited

U.S. PATENT DOCUMENTS

| | | | |
|---|---|---|---|
| 3,065,420 | 11/1962 | Close | 455/8 |
| 3,519,935 | 7/1970 | Hochgraf | 179/175.31 R |
| 3,876,983 | 4/1975 | Zafiropulo et al. | 179/175.3 S |
| 4,112,293 | 9/1978 | Kach | 350/96.16 |
| 4,306,313 | 12/1981 | Baldwin | 179/175.3 F |
| 4,403,139 | 9/1983 | De Loach, Jr. | 455/613 |

FOREIGN PATENT DOCUMENTS 0168342 10/1983 Japan ................................ 455/601

Primary Examiner—Joseph A. Orsino, Jr.
Assistant Examiner—Timothy K. Greer
Attorney, Agent, or Firm—Joseph S. Tripoli; Robert L. Troike; William H. Meise

[57] ABSTRACT

Redundant repeaters are positioned along a fiber optic (FO) bus of a data transmission system, each comprising a first star coupler having an input port connected to the FO bus and having N output ports, a second star coupler having N input ports and an output port connected to the FO bus, first and second repeaters each comprising, in tandem, a receiver whose input is connected to an output port of the first star coupler and a transmitter whose output is connected to an input port of the second star coupler. A fiber optic coupler is connected between a third output port of the first star coupler and a third input port of the second star coupler. A first detector responds to the output signals of the first and second transmitters to identify the existence and the type of failure in the two repeaters.

7 Claims, 5 Drawing Figures

FAIL SAFE REPEATER FOR FIBER OPTIC BUS DISTRIBUTION SYSTEM

BACKGROUND OF THE INVENTION

This invention relates generally to a fiber optic (FO) bus distribution system employed to interface a group of microprocessors distributed along the FO bus and more particularly, to such a system that includes redundant fail/safe repeaters (amplifiers) which, within certain limitations, can fail without disrupting the operation of the overall system.

In bus distributions systems employing a common FO bus with distributed subscriber processors (stations) coupled thereto by coupling logic at various positions along the FO bus, the data-representing light energy flowing in the FO bus is converted into electrical signals by a receiver portion of the coupling logic and supplied to a subscriber processor where it is processed. Conversely, the electrical signals from each subscriber processor are converted to light energy by means of a transmit portion of the coupling logic and supplied back to the FO bus as light energy.

Each processor or subscriber station and the associated coupling logic is defined as a node of the total system. To couple the light energy in either direction between the FO bus and the stations, four port star couplers are typically employed in the prior art. The four port star coupler provides a uni-directional flow of light energy through the FO bus with a portion of the energy passing through coupling logic to the subscriber processor as electrical energy. Energy is then supplied from the processor back to the coupling logic where the electrical signals are transformed into light signals and supplied into the FO bus.

In four port star couplers, however, transfer losses of approximately 3 db occur. Such losses limit the number of nodes (couplers and processors) which may be interconnected in serial manner along the FO bus, before a given processor subscriber in the system no longer receives sufficient energy to function properly. Accordingly, repeaters are typically inserted along the FO bus at appropriate intervals to compensate for the losses occurring in the star couplers and to maintain the level of transmitted light energy sufficiently high to enable the processor subscribers to function properly. Such repeaters commonly take the form of a PIN or photo avalanche diode detector (the repeater receiver) placed in the FO bus back-to-back with an LED or laser driver (the repeater transmitter), which together reconstitute the light energy.

Such an arrangement, however, has the disadvantage that failure of any single repeater will disrupt the loop and cause a system failure, resulting in loss of data. For a more complete description of such prior art, reference is made to co-pending application, Ser. No. 451,429, filed Dec. 20, 1982, by Robert F. Haworth, entitled "Repeater for Fiber Optic Distribution System", assigned to the same assignee as the present invention, and incorporated herein by reference.

The present invention provides a system incorporating fail/safe redundant repeaters which will permit the system to continue operating even after the complete failure of one of the redundant repeaters or a receiver in one of the redundant repeaters and a transmitter in the other.

SUMMARY OF THE INVENTION

In accordance with a preferred form of the invention there is provided, in an FO bus distribution system comprising an FO bus, a plurality of first star couplers each coupled to the FO bus, a plurality of second star couplers each coupled to the FO bus between a different pair of adjacent first star couplers, and a pair of redundant repeater (RR) circuits (each consisting of an optical receiver and a transmitter) and connected between one of the second star couplers and the next first star coupler on the FO bus. The repeater circuit comprises a redundant pair of circuits arranged in parallel with respect to the FO bus for detecting and regenerating the signal supplied thereto from the second star coupler and has a throughput delay time $\Delta$. The repeater circuit further comprises a fiber optic cable connected between the second and first star couplers in parallel with the pair of redundant parallel repeaters and having a delay time $\delta$ where $\delta = \Delta$.

DETAILED DESCRIPTION OF THE INVENTION

Figure 1:
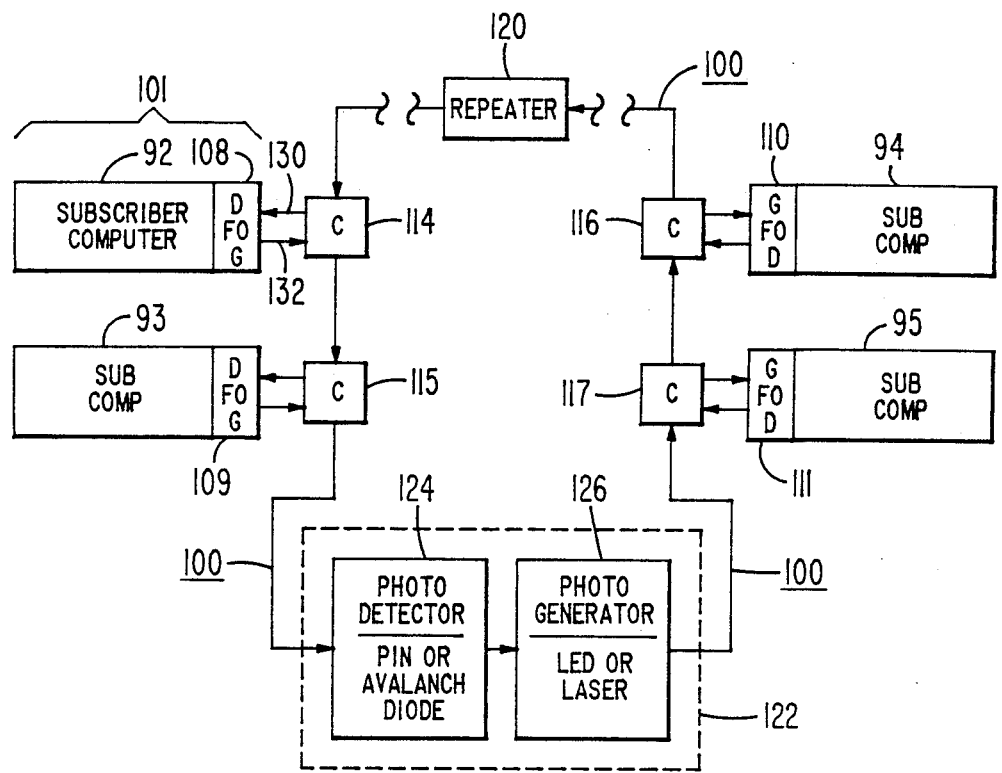
FIG. 1 is a block diagram of a prior art structure.

Referring now to the prior art structure of FIG. 1, there is shown a closed loop FO bus 100 through which the information-carrying light flows only in the direction of the arrows. Coupled to bus 100 are four subscriber computers (SUB COMP) 92, 93, 94, and 95 by means of four star couplers 114, 115, 116, and 117 which transmit and receive optical signals to and from coupling logic elements 108, 109, 110, and 111, respectively. The elements 108-111 each consist of a photo detector designated as D and a photo generator designated as G. The legend FO within the blocks 108-111 indicates that the coupling between the elements 108-111 and the star couplers 114-117 ]each consists of two fiber optic links such as the links 130 and 132 which couple four part star coupler 114 to device 108.

The star couplers 114-117 each produce about a 3 db loss in the signal passing therethrough. Thus, if long transmission distances are present it is necessary to have repeaters in the system, such as repeaters 120 and 122. Each of these repeaters consist of a photo detector and a photo generator such as photo detector 124 and photo generator (transmitter) 126 in repeater 122. The photo detector 123 can be a PIN or an avalanche diode such as described in chapter 34, pages 57-98 of a publication entitled "Optical Fiber Transmission Systems" by Stewart D. Personick, and published in 1981 by Plenum Press of New York City and London.

The photo generator 126 can be a light emitting diode (LED) or a laser such as described on page 530 of a publication entitled "Fiber Optics," edited by Bernard-Bendow and Shashanka-S.-Mitra, and published in 1979 by Plenum Press of New York City and London.

As mentioned above, failure of a repeater such as either of repeaters 120 or 122 in the prior art system of FIG. 1 will disable the system.

Figure 2:
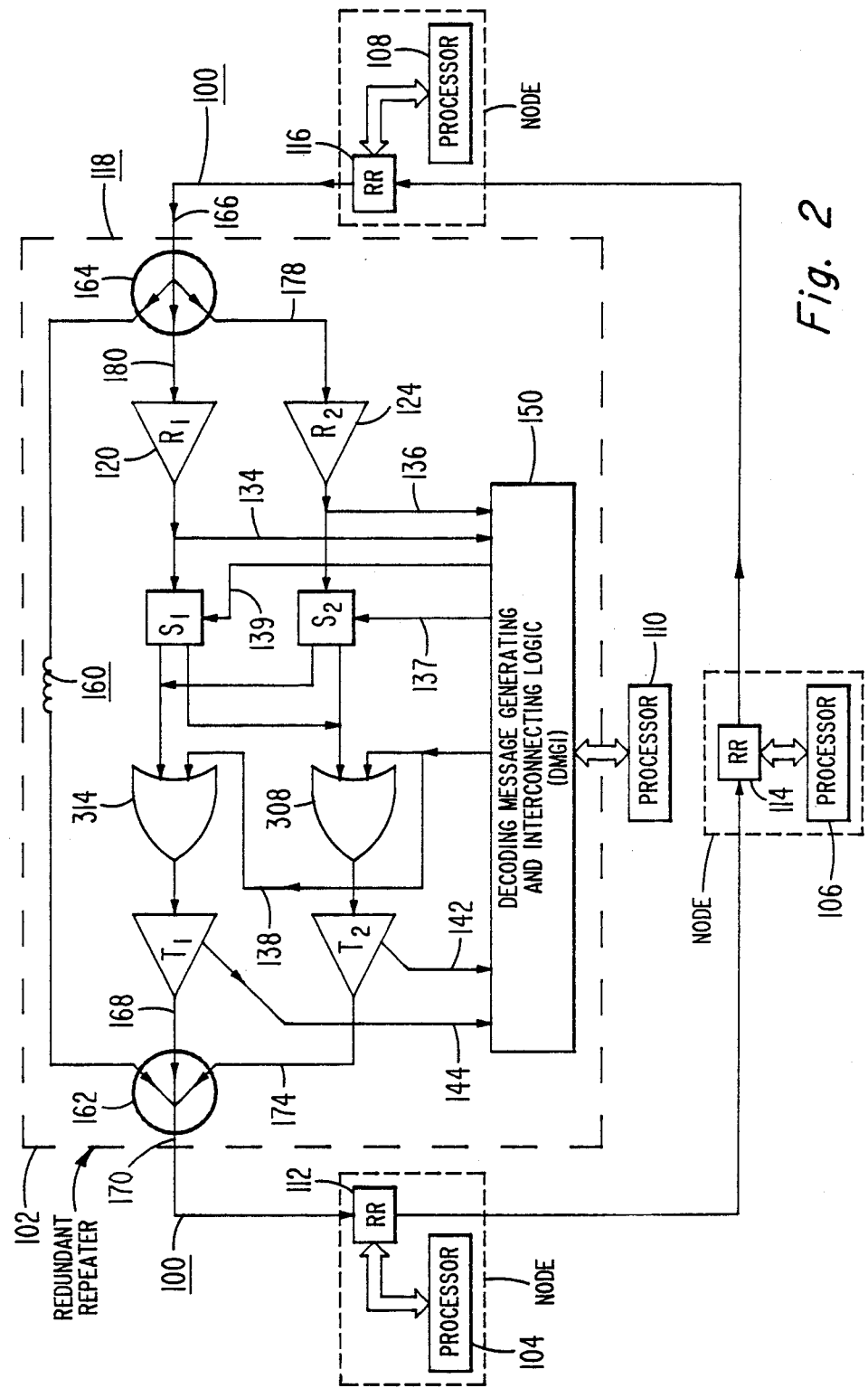
FIG. 2 is a generalized block program of the invention.

Referring now to FIG. 2, there is shown an entire system incorporating the present invention and consisting of four processors 104, 106, 108, and 110 each coupled to the common fiber optic bus 100 by a redundant repeater, which is the subject of the invention, such as redundant repeaters 112, 114, 116 and 118. The specific redundant repeater within block 118 is shown in more detail than are the other three redundant repeaters 112, 114, and 116 and will be discussed in detail in the following paragraphs.

Within the block 118, an optical signal is supplied to a four port star coupler 164 (or other suitable optical coupling means) via input lead 166. The three outputs of the four star coupler 164 are supplied respectively to a receiver $R_2$ via lead 178, to receiver $R_1$ via lead 180, and to a first terminal of the fiber optic coupling element 160.

Within block 118 there are two separate repeaters. One of them consists of a receiver $R_1$ and a transmitter $T_1$ connected in series arrangement, and the other consists of a receiver $R_2$ and a transmitter $T_2$, also arranged in series manner.

All four repeater elements, including receiver elements $R_1$ and $R_2$, and transmitter elements $T_1$ and $T_2$, are assumed at this point in the discussion to be operative. An input signal supplied to input 166 of four port star coupler 164 will be supplied via leads 180 and 178 to the inputs of receivers $R_1$ and $R_2$ which function to convert the optical signals to electrical signals. The output electrical signals from the receiver are applied to the inputs of transmitters $T_1$ and $T_2$, respectively, through two-state switches $S_1$ and $S_2$ when in their first state, and OR gates 314 and 308.

Transmitters $T_1$ and $T_2$ function to amplify and convert the received electrical signals into optical signals, and to supply such optical signals to FO bus 100 through four port star coupler 162, thereby completing the repeater operation. More specifically, the output signals of transmitters $T_1$ and $T_2$ are supplied via leads 168 and 174 to the two inputs of four star port coupler 162, the output of which is supplied through FO bus 100 to an input of another redundant repeater 112 which is identical to redundant repeater 118.

As mentioned above, a third output of four port star coupler 164 is supplied to one end of a fiber optic coupling unit 160. The other end is connected to the third input of four part star coupler 162. The function of fiber optic coupling unit 160, which includes appropriate delay, is to pass a sufficient amount of the signal received at input terminal 166 to output terminal 170 in the event of the failure of both of the two redundant repeaters within the redundant repeater logic 118 so that such received signal can still be reconstructed by the next redundant repeater 112.

The decoding, message generating, and interconnecting logic 150, hereinafter called the DMGI logic, receives the electrical output signals of the two receivers $R_1$ and $R_2$ via leads 134 and 136 and supplies such electrical signals to a data processor 110. Signals generated in processor 110 as well as signals generated within DMGI logic 150 are supplied to the amplifying transmitters $T_1$ and $T_2$ via lead 138 and OR gates 314 and 308 in a manner to be described in more detail later herein in connection with the discussion of FIG. 3.

Also as will be discussed in more detail in connection with FIG. 3, the DMGI logic 150 (FIG. 2) is responsive to the output signals from receivers $R_1$ and $R_2$ via leads 134 and 136 to determine if signal levels are in fact present and if such signal levels are approximately of equal level, indicating proper operation, and, if at different levels (or if one level is not present), indicating improper operation of one of the receivers $R_1$ or $R_2$. The portion of the DMGI logic shown in FIG. 3 further indicates which of the two receivers $R_1$ or $R_2$ is faulty. Similarly, electrical signals generated in the two transmitters $T_1$ and $T_2$ are supplied to the DMGI logic 150 via leads 144 and 142 which will compare such outputs to determine if either of the transmitters $T_1$ or $T_2$ is faulty, and which is the faulty one.

In the event of the failure of either of receivers $R_1$ or $R_2$, or either of transmitters $T_1$ or $T_2$, a message will be supplied to the remaining operating transmitter of transmitters $T_1$ and $T_2$ indicating which one is faulty. Such signal will be supplied to an assigned microprocessor at one of the nodes on the loop (not specifically indicated in the drawings) for diagnostic and maintenance purposes.

It is to be understood that receivers $R_1$ and $R_2$ (FIG. 2) receive optical signals through four port-star coupler 164 from FO bus input terminal 166, and translates such optical signals into electrical signals which are supplied to and through DMGI logic 150 and to processor 110 for various types of processing, as will be described in more detail later herein. The signals supplied from DMGI logic 150, which are either generated therein or supplied from processor 110, are electrical signals which are translated by transmitters $T_1$ and $T_2$ back into optical signals and then supplied through four port star coupler 162 to the next redundant repeater 112.

As mentioned above, if any one or more of the four receiver or transmitter elements $R_1$, $R_2$, $T_1$, or $T_2$ fail, then the repeater 118 is either partially or completely disabled. For example, if $T_1$ fails the repeater consisting of $R_1$ and $T_1$ is disabled, and the signal is passed through the other repeater consisting of $R_2$ and $T_2$. Similarly, if $R_2$ fails, then the repeater consisting of $R_2$ and $T_2$ is disabled, and the signal must be processed by the repeater consisting of $R_1$ and $T_1$.

It is possible, however, to have two failures, one in each of the two repeaters. For example, both $R_1$ and $T_2$ could fail. In this event, switch $S_1$ is caused to function, under control of DMGI logic 150, as will be discussed in FIG. 4, to route the signal through receiver $R_2$, switch $S_2$, transmitter $T_1$, and then through four port star coupler 162 to FO bus 100.

As another example, assume both $T_1$ and $R_2$ fail. Switch $S_1$ responds to the detection of such failure by DMGI logic 150 to route the signal through receiver $R_1$, switch $S_1$, transmitter $T_2$, and four port star coupler 162 to FO bus 100.

As will also be discussed later herein with respect to FIG. 4, the operation of the two switches $S_1$ and $S_2$ is controlled by signals appearing on leads 134, 136, 142, and 144. The interpretation of such signals is effected by DMGI logic 150.

In all cases of failure, an encoded signal will be generated by DMGI logic 150 and supplied to FO bus 100 indicating the nature of the failure and the particular redundant repeater element in which the failure occurred. As mentioned above, a designated microprocessor at a predetermined node in the system loop will respond to such encoded signals to provide for suitable diagnostic and maintenance functions.

Figure 3:
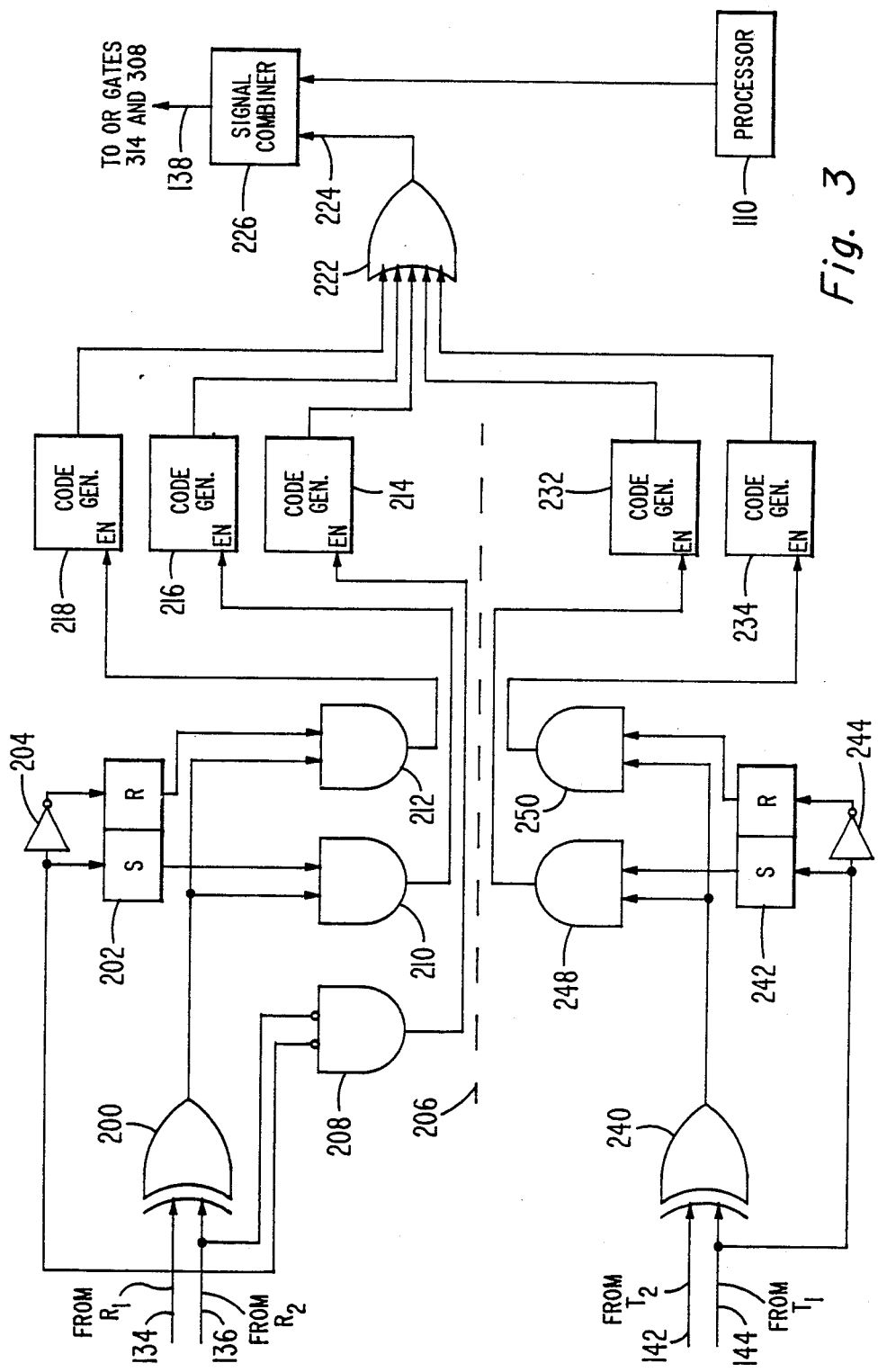
FIG. 3 is a detailed block diagram of a portion of FIG. 2.

Referring now specifically to FIG. 3, there is shown logic for determining if a single one of the two receivers, $R_1$ or $R_2$, or if a single one of the two transmitters $T_1$ or $T_2$ has failed, and for the generation of an encoded message on the FO bus 100 identifying the failed element. The logic of FIG. 3 will also determine if both receivers $R_1$ and $R_2$ have failed. The logic of FIG. 3 will not, however, determine if a receiver of one of the repeaters and the transmitter of the other repeater has failed. The logic for making the last-mentioned determination is shown in FIG. 4, which will be described later herein.

In FIG. 3, the logic above the dotted line 206 determines a failure of either or both of the receivers $R_1$ and $R_2$, and the logic below the dotted line 206 determines the failure of either of the transmitters $T_1$ and $T_2$.

Consider first the logic above the dotted line 206. The outputs of the two receivers $R_1$ and $R_2$ are supplied via leads 134 and 136 to the two inputs of an Exclusive OR (XOR) gate 200. If either receiver $R_1$ or $R_2$ has failed, the output of XOR gate 200 will be a high level signal which will prime AND gates 210 and 212. If the failed receiver is specifically $R_1$ then flip-flop 202 will be reset by the low level failed signal being inverted by inverter 204 and supplied to the reset input of flip-flop 202. AND gate 212 will thereby be energized to enable code generator 218 to generate a code which will be supplied through OR gate 222 to an input 224 of signal combiner 226, where it will be combined with the output of processor 110. The resultant combined signal is supplied to both transmitters $T_1$ and $T_2$ via common lead 138 and OR gates 314 and 308.

The signal generated by code generator 218 can, if desired, be provided with a carrier so that it can be superimposed on the signal generated by processor 110 and then later distinguished therefrom at a predetermined supervisory processor for decoding and diagnostic purposes, as discussed above. Alternatively, the code generator 218 can be a pattern generator (such as a read only memory) which generates a code pattern which is multiplexed with the normal data pattern.

It should be noted that the codes generated by the remaining code generators 216, 214, 232, and 234 of FIG. 3, are also combined with the output from processor 110 in signal combiner 226 in such a manner as to be later separable therefrom at the designated supervisory processor.

Returning again to a consideration of the output signals from receivers $R_1$ and $R_2$ which are supplied to XOR gate 200, assume that only receiver $R_2$ has failed. In this event, the output of XOR gate 200 will again be a high level signal, and will again prime AND gates 210 and 212. However, flip-flop 202 will be set rather than reset since the output of the non-failed receiver $R_1$ is a high level signal. Thus, AND gate 210 will be enabled to produce a high level signal at its output which will enable code generator 216. Code generator 216 will respond to such enablement to generate a signal indicating that $R_2$ has failed. The signal will be supplied through OR gate 222, combined with the output of processor 110 in signal combiner 226, and then supplied to transmitters $T_1$ and $T_2$ via common lead 138 and OR gates 314 and 308.

Assume now that both receivers $R_1$ and $R_2$ have failed. The output of AND gate 208 will then be a high level signal which will enable code generator 214. Code generator 214 will respond thereto to generate a code signal which will be supplied through OR gate 222, to the input 224 of signal combiner 226, where it will be combined with the output of processor 110 and supplied to output lead 138.

In a similar manner, the failure of either transmitter $T_1$ or $T_2$ will energize AND gates 250 and 248, respectively, in the logic below line 206, and accordingly will energize code generators 234 and 232, respectively, to generate codes indicating the failure of either transmitter $T_1$ and $T_2$.

Figure 4:
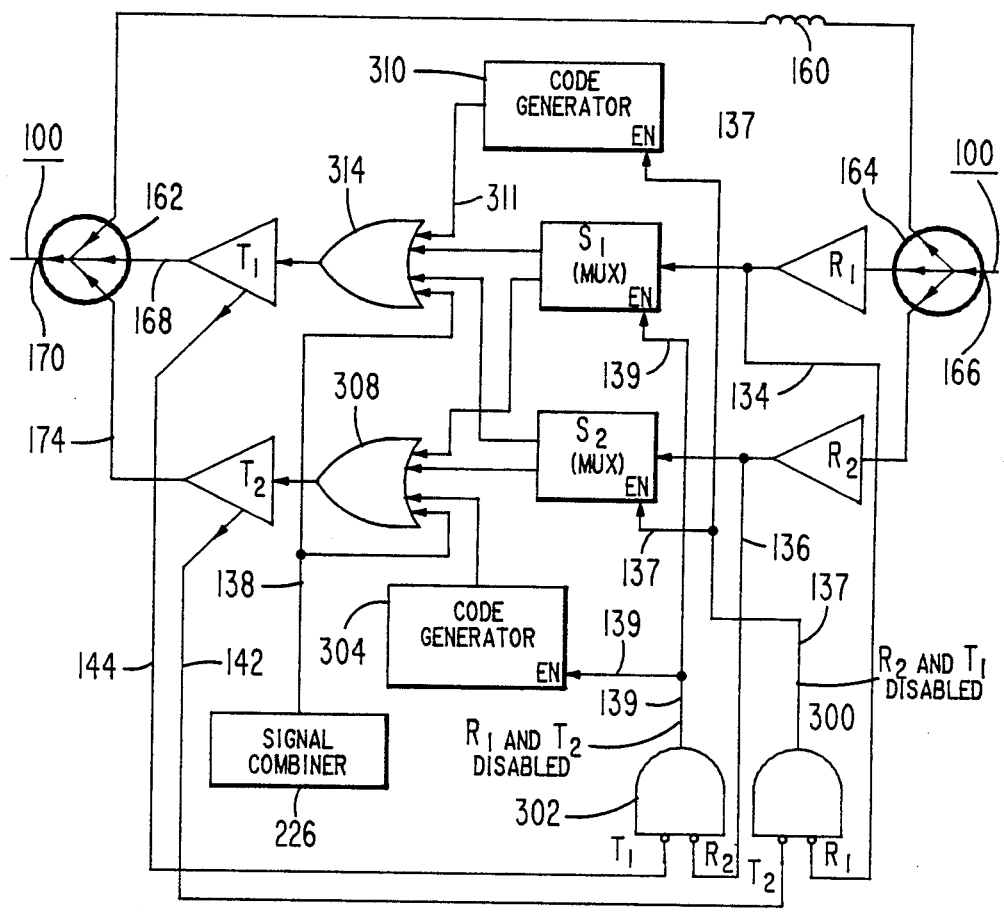
FIG. 4 is a block diagram of another portion of the invention.

Referring now to FIG. 4, there is shown logic for determining when a receiver of one repeater and the transmitter from the other repeater are both in a failed condition, and further logic for generating a coded message indicating such condition and specifically which elements have failed. In FIG. 4, electrical output signals from $R_1$ and $T_2$ are supplied to the inhibit inputs of NOR gate 300, and the electrical output signals from $R_2$ and $T_1$ are supplied to the inhibit inputs of NOR gate 302. Thus, if both $R_1$ and $T_2$ should fail, NOR gate 300 will output a high level signal which will energize code generator 310 and activate multiplexer (MUX) switch $S_2$ to supply the output of operating receiver $R_2$ through OR gate 314 to transmitter $T_1$, thereby maintaining the amplifying function of a complete repeater.

If both $R_2$ should fail, then NOR gate 32 will supply a high level signal to energize code generator 304 and to activate multiplexer (MUX) switch $S_1$, thereby routing the output of operating receiver $R_1$ through switch $S_1$ and then through OR gate 308 to the input of operating transmitter $T_2$.

In summary, code generators 304 and 310 will generate and supply coded signals to the remaining operating transmitter in either type failure. The generated coded signal will indicate whether it is both $R_1$ and $T_2$, or both $R_2$ and $T_1$, that has failed. As an alternative routing, the generated coded signals of FIG. 4 can be routed to transmitters $T_1$ or $T_2$ through signal combiner 226 and then through OR gates 314 and 308.

Figure 5:
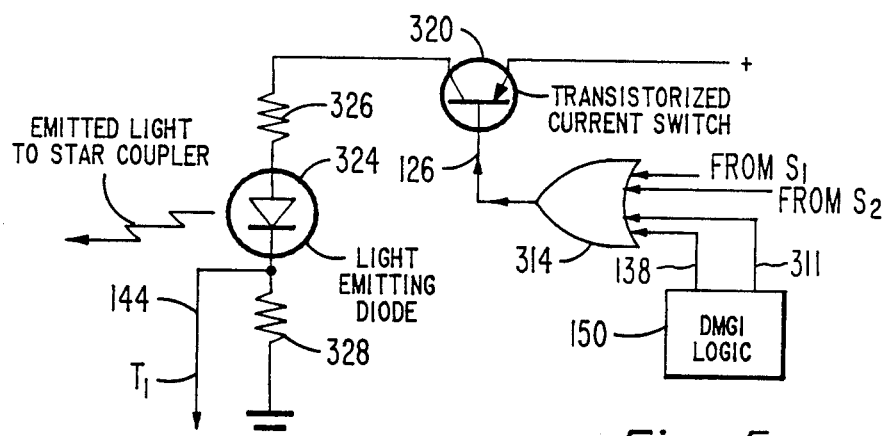
FIG. 5 is a schematic diagram of a transmitter suitable fur use in the invention.

The signals supplied to DMGI logic 150 (FIGS. 2 and 4) from transmitters $T_1$ and $T_2$ via leads 144 and 142 are electrical signals generated within $T_1$ and $T_2$ in the manner shown in FIG. 5. In FIG. 5 a light emitting diode (LED) 324 is energized by a current supplied by transistor type switch 320 and under control of a modulating signal supplied from DMGI logic 150 via OR gate 314. The current flow through LED 324 also flows through resistors 326 and 328 with the voltage developed across resistor 328 being the voltage appearing on lead 144 in FIGS. 2 and 4.

Couplers such as the four port-star couplers 164 and 162 of FIG. 2 are manufactured generally in the following manner. The four port-star coupler is formed by fusing together two parallel optical fibers in a manner such that light entering from the input port of one of the optical fibers will divide and be supplied in predetermined proportions to the output ports of the two optical fibers. For a more detailed discussion of star couplers, including manufacturing techniques and operating characteristics, reference is made to page 540 of the aforementioned publication entitled "Fiber Optics."

What is claimed is:

1. A redundant repeater connected into a transmission system employing a fiber optic (FO) bus and comprising:
   a first star coupler having an input port connected to said FO bus and N output ports;

a second star coupler having N input ports and an output port connected to said FO bus;

a first continuously energized repeater comprising a first receiver and a first transmitter connected in series arrangement between a first output port of said first star coupler and a first input port of said second star coupler to amplify signals supplied to the input port of said first star coupler;

a second continuously energized repeater comprising a second receiver and a second transmitter connected in series arrangement between a second output port of said first star coupler and a second input port of said second star coupler to amplify signals supplied to said input port of said first star coupler;

a fiber optic coupling means connected between a third output port of said first star coupler and a third input port of said second star coupler for coupling signals supplied to said input port of said first star coupler without change to said output port of said second star coupler;

first detecting means responsive to output signals of said first and second transmitters to identify a failure of either of said repeaters;

second detecting means responsive to output signals of said first and second receivers of said repeaters to identify a failure of either of said receivers; and logic means including switching means responsive to said first and second detecting means when only the receiver of one repeater and only the transmitter of the other repeater are in a failed condition to connect the output of the non-failed receiver to the input of the non-failed transmitter.

2. A redundant repeater as in claim 1 and further comprising:
logic means responsive to the identification of a single failed receiver, a single failed transmitter, or the combination of a single failed receiver in one repeater and a single failed transmitter in the other repeater to generate encoded signals identifying such specific failures; and
means including a non-failed transmitter for supplying said encoded signals to said FO bus for transmission thereon.

3. A redundant repeater as in claim 1 and further comprising logic means responsive to the failure of both of said first and second receivers to generate a signal identifying such a failure.

4. In a transmission system employing a fiber optic (FO) bus a redundant repeater positioned along said FO bus and comprising:
a first optical coupling means having an input terminal connected to a first end of said FO bus and having N output terminals;
a second optical coupling means having an output terminal connected to a second open end of said FO bus and having N input terminals;
first and second repeaters each comprising, in tandem, a receiver and a transmitter connected between a output terminal of said first optical coupling means and an input terminal of said second optical coupling means; and
first detecting means responsive to output signals generated by said transmitters of said first and second repeaters to identify a failure of either of said transmitters;

second detecting means responsive to the output signals of said receivers of said repeater to identify a failure of either of said receivers; and logic means including switching means responsive to said first and second detecting means when only the receiver of said first repeater and only the transmitter of said second repeater are in a failed condition to connect the output of the non-failed receiver to the input of the non-failed transmitter.

5. A redundant repeater as in claim 4 and further comprising;
logic means responsive to the identification of a single failed receiver, a single failed transmitter, or the combination of a single failed receiver in one repeater and a single failed transmitter in the other repeater to generate encoded signals identifying such specific failures; and
means including a non-failed transmitter for supplying said encoded signals to said FO bus for transmission thereon.

6. A redundant repeater as in claim 4 and further comprising logic means responsive to the failure of both receivers to generate a signal identifying such a failure.

7. A redundant repeater arrangement adapted for use in a fiber optic transmission system, said arrangement comprising:
a first optical star coupler including an input port and at least first and second output ports;
a second optical star coupler including an output port and first and second input ports;
a first continuously energized repeater including a first receiver having an input port coupled to said first output port of said first star coupler and also having an output terminal, and a first transmitter having an output port coupled to said first input port of said second star coupler and also having an input terminal, and also including a first single input multiple output switch having its single input terminal coupled to said output terminal of said first receiver and a first of its output terminals coupled to a first input terminal of a first OR gate, the output of which is coupled to said input terminal of said first transmitter.
a second continuously energized repeater including a second receiver having an input port coupled to said second output port of said first star coupler and also having an output terminal, and a second transmitter having an output port coupled to said second input port of said second star coupler and also having an input multiple output switch having its single input terminal coupled to said output terminal of said second receiver and a first of its output terminals coupled to a first input of a second OR gate, the output of which is coupled to said input terminal of said second transmitter;
failure detecting means coupled to said first and second repeaters for sensing the simultaneous failure of said first receiver and second transmitter concurrent with non-failure of said second receiver and said first transmitter and for operating said second switch to couple signal from said output terminal of said second receiver to a second output terminal of said second switch; and
means for coupling said second output terminal of said second switch to a second input terminal of said first OR gate for coupling signals from said non-failed second receiver to said non-failed first transmitter.

* * * * *